US012723554B2

(12) United States Patent
Mitani et al.

(10) Patent No.: US 12,723,554 B2
(45) Date of Patent: Sep. 1, 2026

(54) CONTROLLER FOR INJECTORS

(71) Applicant: TOYOTA JIDOSHA KABUSHIKI KAISHA, Toyota (JP)

(72) Inventors: Shinichi Mitani, Susono (JP); Makoto Tomimatsu, Susono (JP); Kazuaki Jojima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/055,506

(22) Filed: Feb. 18, 2025

(65) Prior Publication Data

US 2025/0290464 A1 Sep. 18, 2025

(30) Foreign Application Priority Data

Mar. 18, 2024 (JP) ................................ 2024-042484

(51) Int. Cl.
*F02D 41/40* (2006.01)

(52) U.S. Cl.
CPC .... *F02D 41/402* (2013.01); *F02D 2200/1002* (2013.01)

(58) Field of Classification Search
CPC ............................ F02D 41/021; F02B 63/042
See application file for complete search history.

(56) References Cited

U.S. PATENT DOCUMENTS

2007/0106451 A1* 5/2007 Kuroda ................. B60W 10/06 123/339.14
2009/0292440 A1* 11/2009 Ichihara .............. F02D 41/1498 123/90.15
2016/0258345 A1 9/2016 Kimura
2018/0283299 A1* 10/2018 Kondo ................ F02D 41/2467

FOREIGN PATENT DOCUMENTS

JP 2016164402 A 9/2016
JP 2019065714 A 4/2019

* cited by examiner

*Primary Examiner* — Kevin A Lathers

(57) ABSTRACT

A controller for injectors is provided. A torque difference is a difference between an individual cylinder torque and an all-cylinder mean torque. Correction information indicates a correspondence relationship between the torque difference and an injection correction value. In the correction information, the injection correction value for a case in which the individual cylinder torque is greater than the all-cylinder mean torque indicates a decrease correction. The injection correction value for a case in which the individual cylinder torque is less than the all-cylinder mean torque indicates an increase correction. When the absolute value of the torque difference during the increase correction is equal to the absolute value of the torque difference during the decrease correction, a correction amount of the increase correction is greater than a correction amount of the decrease correction.

4 Claims, 2 Drawing Sheets

CONTROLLER FOR INJECTORS

CROSS-REFERENCE TO RELATED APPLICATIONS

This application is based upon and claims the benefit of priority from Japanese Patent Application No. 2024-042484, filed on Mar. 18, 2024, the entire contents of which are incorporated herein by reference.

BACKGROUND

1. Field

The present disclosure relates to a controller for injectors.

2. Description of Related Art

Japanese Laid-Open Patent Publication No. 2019-065714 discloses an internal combustion engine that includes multiple cylinders and injectors for the respective cylinders. Each injector supplies fuel to the corresponding cylinder. A controller for the internal combustion engine monitors the air-fuel ratio of each cylinder.

The air-fuel ratio of one of the cylinders may be leaner than the air-fuel ratios of the other cylinders. In such a case, the controller increases the amount of fuel supplied to the cylinder having a lean air-fuel ratio. The controller increases the amount of additional fuel in proportion to the degree of deviation in the air-fuel ratio.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for injectors. The controller includes processing circuitry and a memory module. The memory module stores correction information. The correction information indicates a correspondence relationship between a torque difference and an injection correction value. Control targets of the controller are injectors. The injectors are provided in an internal combustion engine having multiple cylinders to correspond to the respective cylinders and supply fuel to each of the cylinders. The processing circuitry is configured to repeatedly execute injection control during operation of the internal combustion engine. The injection control calculates the torque difference for each of the cylinders over a specified period of time during operation of the internal combustion engine. The torque difference is a difference between an individual cylinder torque and an all-cylinder mean torque. The individual cylinder torque is a mean value of the torque of each of the cylinders over the specific period of time. The all-cylinder mean torque is a mean value of the torque for all of the cylinders over the specific period of time. The injection control calculates, based on the correction information, the injection correction value in correspondence with the torque difference for each cylinder. The injection correction value is a correction value for a fuel injection amount from each injector. In the correction information, the injection correction value for a case in which the individual cylinder torque is greater than the all-cylinder mean torque is a value indicating a decrease correction. The injection correction value for a case in which the individual cylinder torque is less than the all-cylinder mean torque is a value indicating an increase correction. The decrease correction decreases the fuel injection amount. The increase correction increases the fuel injection amount. When an absolute value of the torque difference during the increase correction is equal to an absolute value of the torque difference during the decrease correction, a correction amount of the increase correction is greater than a correction amount of the decrease correction. The injection control calculates a corrected injection amount for each of the cylinders by using the injection correction value. The corrected injection amount is obtained by correcting a base injection amount with the injection correction value. The base injection amount corresponds to an operating state of the internal combustion engine. The injection control supplies the corrected injection amount to each of the cylinders at a specified cycle through control of the injectors during the specific period of time).

With the above configuration, it is possible to suppress fluctuations in torque in the internal combustion engine.

In an internal combustion engine including multiple cylinders, the air-fuel ratio of each cylinder may vary. When the variation between the air-fuel ratios of the multiple cylinders increases, the difference between the torques of the multiple cylinders may increase. A large torque difference is undesirable. Therefore, it is conceivable to correct the amount of fuel supplied to each cylinder in order to eliminate the torque difference between the cylinders. However, when the correction amount of the supplied fuel is uniformly increased for all the cylinders in accordance with the degree of deviation of the air-fuel ratio, the following event may occur. That is, in a cylinder in which the degree of deviation of the air-fuel ratio is large, the air-fuel ratio may rapidly change. Accordingly, the torque may suddenly change. On the other hand, depending on the air-fuel ratio, the combustion state of the air-fuel mixture in the cylinder may become unstable. There may be a cylinder in which the torque is likely to fluctuate due to the instability of the combustion state. However, if the air-fuel ratio of the cylinder is gradually changed, the situation in which the torque is likely to fluctuate cannot be quickly eliminated. The above configuration improves such a disadvantage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Overall Configuration

Figure 1:
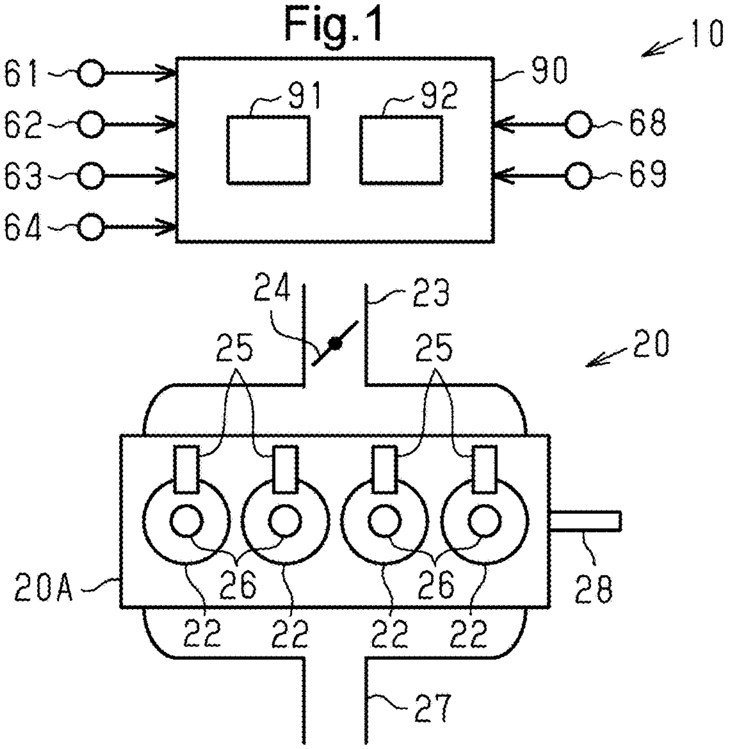
FIG. 1 is a schematic diagram showing a configuration of an internal combustion engine.

FIGS. 1 to 4 illustrate a controller for injectors according to an embodiment of the present disclosure. As shown in FIG. 1, the vehicle 10 is provided with an internal combustion engine 20. The internal combustion engine 20 is a drive source of the vehicle 10. The internal combustion engine 20 includes multiple cylinders 22 and a crankshaft 28. The number of the cylinders 22 is four. The cylinders 22 are spaces defined by the 20A of the engine body of the internal combustion engine 20. The cylinder 22 is a space for combusting a mixture of fuel and intake air. Although not shown, the cylinder 22 houses a piston. The piston reciprocates in the cylinder 22 in response to combustion of the air-fuel mixture. The crankshaft 28 rotates in accordance with the reciprocation of the piston.

The internal combustion engine 20 includes multiple injectors 25 and multiple ignition plugs 26. The injector 25 is provided for each cylinder 22. An injection port of the injector 25 is located in the cylinder 22. The injector 25 injects fuel into the cylinder 22. The injector 25 supplies, for example, gasoline as fuel into the cylinder 22. The ignition plug 26 is provided for each cylinder 22. The ignition plug 26 ignites the air-fuel mixture in the cylinder 22 by spark discharge.

The internal combustion engine 20 includes an intake passage 23 and an exhaust passage 27. The intake passage 23 is a passage for introducing intake air into each cylinder 22. The intake passage 23 is connected to each cylinder 22. In the middle of the intake passage 23, a throttle valve 24 whose opening degree can be adjusted is provided. The intake air amount changes according to the opening degree of the throttle valve 24. The exhaust passage 27 is a passage for discharging exhaust gas from each cylinder 22. The exhaust passage 27 is connected to each cylinder 22. Although not shown, a three way catalyst or the like for purifying the exhaust gas is present in the middle of the exhaust passage 27.

The internal combustion engine 20 includes multiple sensors. For example, the internal combustion engine 20 includes a crank angle sensor 61, an air flow meter 62, a water temperature sensor 63, and an air-fuel ratio sensor 64. The crank angle sensor 61 detects a rotation angle of the crankshaft 28. The air flow meter 62 detects the flow rate of the gas flowing through the intake passage 23 as the intake air amount. The coolant flows through a water jacket defined in the engine body 20A. The water temperature sensor 63 detects the outlet temperature of the cooling water as the engine water temperature. The air-fuel ratio sensor 64 detects the air-fuel ratio of the exhaust gas. The vehicle 10 also includes an accelerator sensor 68 and a vehicle speed sensor 69. The accelerator sensor 68 detects a depression amount of an accelerator pedal in the vehicle 10 as an accelerator operation amount. The vehicle speed sensor 69 detects a traveling speed of the vehicle 10 as a vehicle speed. Each of these sensors repeatedly transmits a signal corresponding to information detected by the sensor itself to the controller 90.

The vehicle 10 includes a controller 90. The controller 90 includes a the CPU 91 and a memory module 92. The CPU is an execution unit, a processing device, or processing circuitry. The memory module 92 includes three types of storage media of a RAM, a ROM, and an electrically rewritable nonvolatile memory module. In the present embodiment, these three types of storage media are collectively referred to as a memory module 92. The memory module 92 stores in advance various programs describing processes to be executed by the CPU 91. In addition, the memory module 92 stores in advance various kinds of information necessary for the CPU 91 to execute various programs. The memory module 92 is a storage unit, a storage device, or a storage circuit.

The CPU repeatedly receives detection signals from various sensors mounted in the vehicle 10. The CPU calculates necessary parameters at any time based on the detection signals received from the various sensors. For example, the CPU 91 calculates the engine rotation speed based on the detection signal of the crank angle sensor 61. The engine rotational speed is the rotational speed of the crankshaft 28.

The CPU controls various operation target devices in the internal combustion engine 20. The operation target devices include an injector 25, an ignition plug 26, a throttle valve 24, and the like. When an ignition switch in the vehicle 10 is turned on, the CPU 91 starts the internal combustion engine 20 by controlling various devices to be operated. When the start of the internal combustion engine 20 is completed, the CPU 91 repeats the injection control for the injector 25 thereafter until the ignition switch is switched off. In parallel with the injection control, the CPU 91 repeats the ignition timing control for the ignition plugs 26, the opening degree adjustment control for the throttle valve 24, and the like. Through these controls, the CPU 91 continues the operation of the internal combustion engine 20. That is, the CPU 91 repeats the injection control of the injector 25 during the operation of the internal combustion engine 20. Hereinafter, the certain period during the operation of the internal combustion engine 20 is referred to as a control period. The control period is determined in advance as a time shorter than one second, for example. The control period is longer than the time required for one combustion cycle when the internal combustion engine 20 is operating at its own minimum engine speed. One combustion cycle is a series of periods in which one cylinder 22 undergoes each of an intake stroke, a compression stroke, an expansion stroke, and an exhaust stroke.

Injection Control

Figure 2:
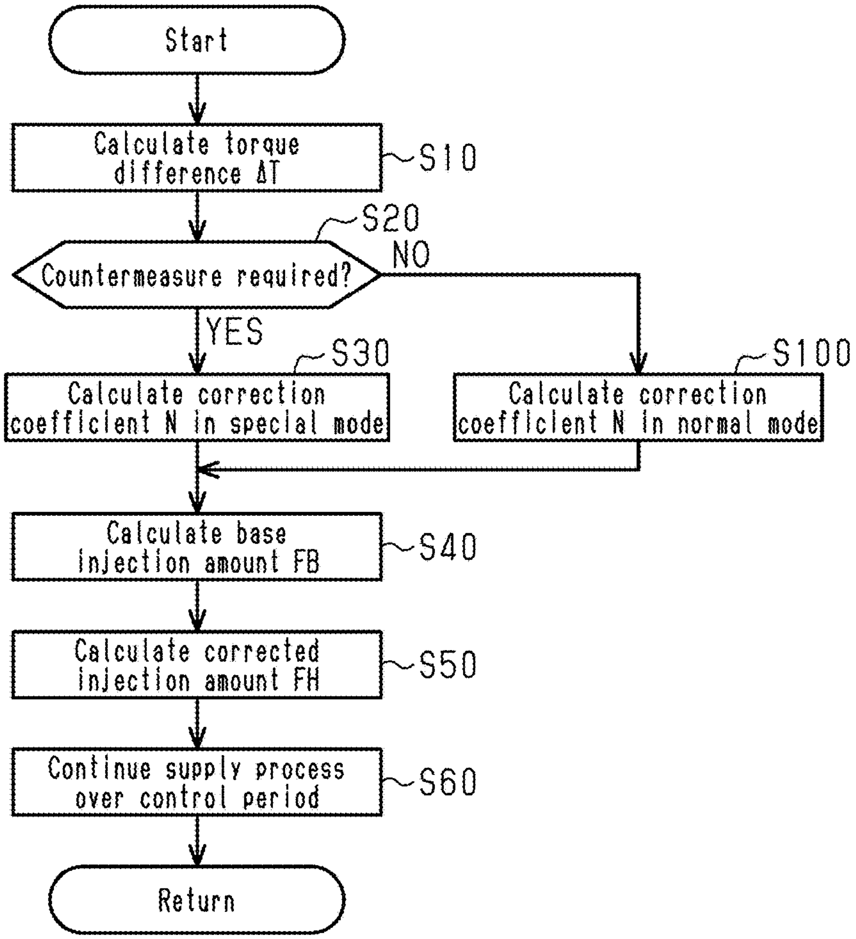
FIG. 2 is a flowchart showing the process contents of injection control for the internal combustion engine shown in FIG. 1.

Hereinafter, a flow of a series of processes in the injection control will be described. As shown in FIG. 2, when the injection control is started, the CPU 91 first executes the process of step S10. In step S10, the CPU 91 calculates the torque difference $\Delta T$ for each of the cylinders 22 for the control period. The torque difference $\Delta T$ is a value obtained by subtracting the all-cylinder mean torque from the individual cylinder torque. The individual cylinder torque is a mean value of the torque of a certain cylinder 22 over the control period. The all-cylinder mean torque is a mean value of the torques of all the cylinders 22 over the control period. Strictly speaking, the torque of a certain cylinder 22 is the torque of the crankshaft 28 corresponding to the combustion of the air-fuel mixture in the certain cylinder 22. On the premise that the CPU 91 calculates the torque difference ΔT for each of the cylinders 22, the memory module 92 stores, in time series, the transition of the engine rotation speed from when the ignition switch is turned on to when step S10 is executed. In step S10, the CPU 91 first refers to this time series. The CPU extracts, from the time series, a datum in a period going back to before the control period from the execution time point of the step S10. As will be described later, the CPU 91 causes the injector 25 to perform fuel injection over a control period in the process of step S60 described later. The previous data corresponds to the transition of the engine rotation speed over the period in which the process of step S60 was performed by the CPU 91 in the previous injection control. The CPU calculates the transition of the differential value of the engine speed over the control period based on the previous data. The differential value of the engine rotational speed reflects the torque of the crankshaft 28. Therefore, the CPU 91 calculates the individual cylinder torque of each of the cylinders 22 and the all-cylinder mean torque based on the transition of the calculated differential value of the engine rotation speed. The CPU calculates the torque difference ΔT of each of the cylinders 22 based on the individual cylinder torque of each of the cylinders 22 and the all-cylinder mean torque. As can be seen from the previous data-targeted period, each value calculated by the CPU 91 is targeted for the control period in which the process of step S60 was previously performed.

In step S10, the CPU 91 calculates the individual cylinder torque of each of the cylinders 22, and stores the calculated individual cylinder torque of each of the cylinders 22 in the memory module 92. That is, in step S10, the CPU 91 stores the individual cylinder torques of the respective cylinders 22, which are obtained as a result of performing the process of step S60 of the previous injection control, in the memory module 92. When storing the individual cylinder torques, the CPU 91 stores the individual cylinder torques of the respective cylinders 22 in the memory module 92 in association with identification information for distinguishing the respective cylinders 22. In the present embodiment, a cylinder number, which is a number assigned in advance to each cylinder 22, is employed as an example of the identification information. When storing the individual cylinder torques of the respective cylinders 22 in the memory module 92, the CPU 91 stores the new individual cylinder torques in the memory module 92 in such a manner that the new individual cylinder torques are arranged in chronological order with respect to the individual cylinder torques stored in the previous step S10. Therefore, the memory module 92 stores the transition of the individual cylinder torque of each cylinder 22 in time series. For example, regarding a certain cylinder 22, the most recent individual cylinder torque in the chronological sequence is the individual cylinder torque obtained as a result of performing the process of step S60 during the control period in the previous injection control. In other words, the previous injection control is performed prior to the current injection control. The current injection control is performed for the latest individual cylinder torque. In the time series of the individual cylinder torques, the individual cylinder torque at the timing preceding by one to the latest individual cylinder torque is the individual cylinder torque obtained as a result of performing the processing of step S60 in the second previous injection control for the control period. That is, the second previous injection control is performed prior to the previous injection control. As described above, in step S10, the CPU 91 calculates the torque difference ΔT for each of the cylinders 22 and stores the individual cylinder torque for each of the cylinders 22.

The process of step S10 is a part of the first process. The first process calculates the torque difference ΔT for each cylinder 22. When the processing in step S10 is finished, the CPU 91 advances the processing to step S20. Since the time-series datum of the individual cylinder torque required for the series of processes is insufficient in the first and second injection controls, the CPU 91 cancels the process of step S20 and advances the process to step S100.

In step S20, the CPU 91 determines whether or not a special countermeasure is required when correcting the fuel injection amount by the injector 25. On the assumption that the CPU 91 performs the process of step S20, the memory module 92 stores a list of increased-injection cylinders in advance. The increased-injection cylinder list is information in which the cylinder number of the cylinder 22 designated as the increased-injection cylinder is described. The increased-injection cylinder is the cylinder 22 in which the fuel injection amount is corrected to be increased in the previous injection control. That is, the increased-injection cylinder is the cylinder 22 in which the corrected injection amount FH is made larger than the base injection amount FB. The description of which cylinder 22 is the increased-injection cylinder is also provided in the process of step S50 described below. The numbers of the cylinders described in the list of increased-injection cylinders are updated each time in the process of step S50 described later. That is, the numbers of the cylinders described in the list of increased-injection cylinders at the present time correspond to those stored in the memory module 92 as the increased-injection cylinders in step S50 of the previous injection control. In step S20, the CPU 91 refers to the list of increased-injection cylinders. The CPU specifies the cylinders 22 currently designated as the increased-injection cylinders. The CPU performs the following for the increased-injection cylinders. That is, the CPU 91 refers to the time series of the transitions of the individual cylinder torques of the increased-injection cylinders among the transitions of the individual cylinder torques of the cylinders 22 stored in the memory module 92. The CPU performs the necessity determination on the time series. In the necessity determination, the CPU 91 determines whether or not the latest individual cylinder torque in the time-series individual cylinder torque is less than the individual cylinder torque at the previous timing. When there are multiple increased-injection cylinders, the CPU 91 performs the necessity determination for each of the increased-injection cylinders. When all the determination results of the necessity determination in the respective amount-increased-injection cylinders are negative, the CPU 91 determines that the specific method is not necessary when the fuel injection amount is corrected (step S20: NO). In this case, the CPU 91 advances the processing to step S100. The process of step S20 is a part of the first process.

Figure 3:
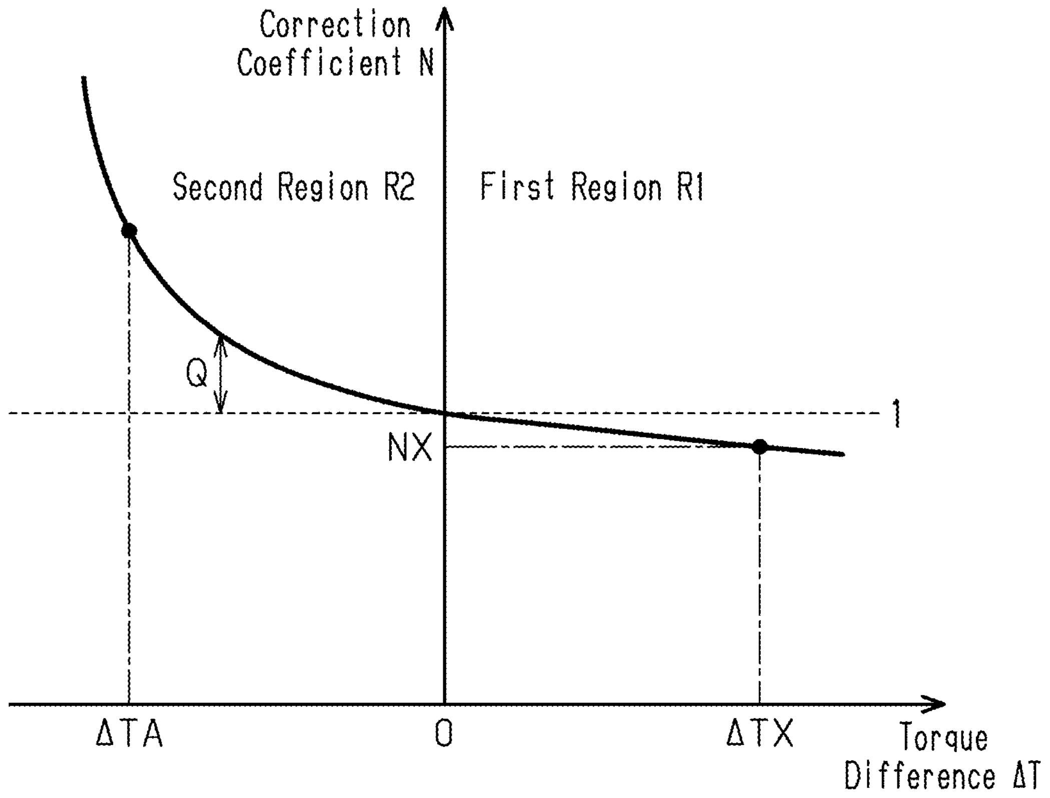
FIG. 3 is a graph showing correction information used in the injection control shown in FIG. 2.

In step S100, the CPU 91 calculates the correction coefficient N for each of the cylinders 22 in the normal mode. The correction coefficient N is an injection correction value of the fuel injection amount by the injector 25. On the assumption that the CPU 91 calculates the correction coefficient N, the memory module 92 stores correction information in advance. As shown in FIG. 3, the correction information indicates the correspondence between the torque difference ΔT and the correction coefficient N. In the correction information, a region where the torque difference ΔT is a positive value is referred to as a first region R1. In the correction information, a region in which the torque difference ΔT is a negative value is referred to as a second region R2. The correction information has the following characteristics. The correction coefficient N is 1 when the torque difference ΔT is 0. The correction coefficient N of the first region R1 is less than 1. The correction coefficient N of the second region R2 is greater than 1. The correction coefficient N of the first region R1 decreases as the torque difference ΔT increases. The correction coefficient N of the first region R1 changes substantially linearly in accordance with the torque difference ΔT. The correction coefficient N of the second region R2 increases as the torque difference ΔT increases. The correction coefficient N in the second region R2 changes nonlinearly in accordance with the absolute values of the torque differences ΔT. To be specific, the correction coefficient N of the second region R2 increases like an exponential function in accordance with the absolute values of the torque differences ΔT. For each torque difference ΔT, the absolute value of the difference between the correction coefficient N and 1 is referred to as a difference value Q. The difference value Q of the first region R1 and the difference value Q of the second region R2 are compared when the absolute values of the torque difference ΔT are the same. At this time, in the absolute values of the torque differences ΔT, the difference value Q in the second region R2 is larger than the difference value Q in the first region R1.

In step S100, when calculating the correction coefficient N for each of the cylinders 22, the CPU 91 refers to the correction information and the torque difference ΔT for each of the cylinders 22 calculated in step S10. The CPU calculates the correction coefficient N of each of the cylinders 22 by a normal method. The normal method will be described with respect to one cylinder 22. In the normal method, the CPU 91 calculates the correction coefficient N corresponding to the torque difference ΔT at the present time in the correction information as the correction coefficient N to be applied at the present time. As described above, in step S100, the CPU 91 sets the correction coefficient N to a value corresponding to the current torque difference ΔT in each of the cylinders 22 based on the correction information. As shown in FIG. 2, when the CPU 91 calculates the correction coefficient N for each of the cylinders 22, the SL advances the processing to step S40. The process of step S100 is a part of the second process. In the second process, the injection correction value (N) for each cylinder 22 corresponding to the torque difference ΔT is calculated based on the correction information.

On the other hand, in step S20, when the determination result of the necessity determination is positive in one or multiple amount-increased-injection cylinders, the CPU 91 determines that the specific method is necessary when correcting the fuel injection amount (step S20: YES). The identification approach is a special deal. In this case, the CPU 91 advances the processing to step S30.

In step S30, the CPU 91 calculates the correction coefficient N for each of the cylinders 22 in the special mode. The cylinders 22 for which the determination result of the necessity determination in step S20 is positive are referred to as specific increased-injection cylinders. In the special aspect, the CPU 91 calculates the correction coefficient N by the specific method only for the specific increased-injection cylinders among the multiple cylinders 22. The specific method is a handling method different from the normal method. On the other hand, for each of the cylinders 22 other than the specific increased-injection cylinder, the correction coefficient N is calculated by the normal method. Each of the other cylinders 22 is an amount-increased-injection cylinder and is a cylinder 22 for which the determination result of the necessity determination is negative. That is, each of the cylinders 22 other than the specific increased-injection cylinder is not designated as the increased-injection cylinder.

A specifying method in the special mode will be described with respect to a certain specific increased-injection cylinder. In the specific method, the CPU 91 sets the specific correction values NX as the correction coefficients N to be applied to the specific increased-injection cylinders. The specific correction value NX will be described. As a premise, among the torque differences ΔT at the present time calculated in step S10, the torque difference ΔTA of the specific increased-injection cylinders is a negative value as illustrated in FIG. 3. The reason why the torque difference ΔTA of the specific increased-injection cylinder becomes a negative value will be described later. The magnitude of the torque difference ΔTA shown in FIG. 3 is an example. A positive value having the same absolute value as the absolute value of the torque difference ΔTA of the specific increased-injection cylinder is referred to as a symmetrical torque difference ΔTX. In other words, the symmetrical torque difference ΔTX is a positive value. The symmetrical torque difference ΔTX is the same as the absolute value of the torque difference ΔTA of the increased-injection cylinder. The specific correction value NX is determined in advance as the correction coefficient N corresponding to the symmetrical torque difference ΔTX in the correction information. In the specific method, the CPU 91 sets the specific correction values NX as the correction coefficients N to be applied to the specific increased-injection cylinders. When there are multiple specific increased-injection cylinders, the CPU 91 determines the correction coefficient N to be applied to each of the specific increased-injection cylinders at the present time by applying the specific method to each of the specific increased-injection cylinders. As shown in FIG. 2, when the CPU 91 sets the correction coefficient N for each of the specific increased-injection cylinders and the other cylinders 22, the SL advances the processing to step S40. The process of step S30 is a part of the second process.

In step S40, the CPU 91 calculates the base injection amount FB. The basic injection quantity FB depends on the current operating state of the internal combustion engine 20. The base injection amount FB is a base value of the fuel injection amount. The base injection amount FB is a value for one cylinder 22. The CPU calculates the base injection amount FB based on the required torque for the internal combustion engine 20, the operation state of the internal combustion engine 20, and the like. The required torque is grasped from the accelerator operation amount and the vehicle speed. The operating state of the internal combustion engine 20 includes an engine rotational speed and an intake air amount. The target air-fuel ratio of each cylinder 22 in the present embodiment is the stoichiometric air-fuel ratio AS. That is, the base injection amount FB of the present embodiment is theoretically calculated so that the air-fuel ratio in the cylinder 22 coincides with the stoichiometric air-fuel ratio AS. After calculating the base injection amount FB corresponding to the operation state of the internal combustion engine 20, the CPU 91 advances the processing to step S50.

In step S50, the CPU 91 calculates the corrected injection amount FH for each of the cylinders 22. The corrected injection amount FH is a value obtained by correcting the base injection amount FB by the correction coefficient N. As a specific process of step S50, the CPU 91 performs the following for each of the cylinders 22. For one of the cylinders 22, the CPU 91 calculates, as the corrected injection amount FH, the product of the correction coefficient N for the one of the cylinders 22 calculated in step S30 or step S100 and the base injection amount FB calculated in step S40. After calculating the corrected injection amount FH for each of the cylinders 22, the CPU 91 updates the contents of the list of increased-injection cylinders stored in the memory module 92. To be more specific, the CPU 91 clears the contents of the list of increased-injection cylinders at the present time, and then describes the numbers of the cylinders 22 corresponding to the increased-injection cylinders in the list of increased-injection cylinders. The increased-injection cylinders are the cylinders 22 for which the correction coefficient N calculated in step S30 or step S100 is greater than 1. That is, the CPU 91 stores the cylinders 22 in which the corrected injection amount FH is larger than the base injection amount FB in the memory module 92 as the increased-injection cylinders. The process of step S50 is a third process. The third process calculates the corrected injection amount FH for each cylinder 22 by using the injection correction value (N). When the processing in step S50 is finished, the CPU 91 advances the processing to step S60.

In step S60, the CPU 91 controls the injector 25 of each of the cylinders 22 based on the corrected injection amount FH calculated in step S50. A certain cylinder 22 is referred to as a target cylinder. The CPU is configured to perform the supplying process on the target cylinders. The supply process is a process of controlling the injector 25 of the target cylinder such that the injector 25 injects the corrected injection amount FH of the target cylinder in a specified cycle. The specified cycle of the present embodiment is determined in advance as one combustion cycle. In the supplying process, when a predetermined multi-stage injection condition is satisfied, the CPU 91 divides the corrected injection amount FH of the target cylinders into multiple divided amounts during one combustion cycle. The CPU supplies the multiple divided amounts to the target cylinders in multiple stages. An example of the multi-stage injection condition is that the engine water temperature is less than a specified value. When the multi-stage injection condition is not satisfied, the CPU 91 completes the injection of the corrected injection amount FH of the target cylinders by one fuel injection in one combustion cycle. In step S60, the CPU 91 continues the supplying process for each of the cylinders 22 over the control period. That is, the CPU 91 supplies the corrected injection amount FH for each of the cylinders 22 to each of the cylinders 22 through the control of the injector 25 in each specified cycle during the control period. The process of step S60 is a fourth process. In the fourth process, the corrected injection amount FH is supplied to each of the cylinders 22 through the control of the injector 25 at every specified cycle during a certain period. When the control period has elapsed from the start of step S60, the CPU 91 ends the process of step S60. The CPU temporarily ends the series of processes of the injection control. Thereafter, the CPU 91 promptly starts the processing of step S10 of the new injection control.

Correction Information

As described in the process of step S50, the CPU 91 calculates the product of the base injection amount FB and the correction coefficient N as the corrected injection amount FH. As can be seen from this, when the correction coefficient N is less than 1, the CPU 91 decreases the base injection amount FB. That is, the correction coefficient N of the first region R1 in the correction information shown in FIG. 3 is a value indicating a decrease correction for decreasing the fuel injection amount. On the other hand, when the correction coefficient N is greater than 1, the CPU 91 increases the base injection amount FB. That is, the correction coefficient N of the second region R2 in the correction information is a value indicating an increase correction for increasing the fuel injection amount.

The absolute value of the difference between the corrected injection amount FH and the base injection amount FB is referred to as a correction amount. The correction amount increases as the difference value Q, which is the absolute value of the difference between the correction coefficient N and 1, increases. That is, the difference value Q is a parameter that reflects the correction amount. As shown in FIG. 3, in the first region R1 of the correction information, the difference value Q increases as the torque difference ΔT increases. That is, in the first region R1, the correction amount of the decrease correction increases as the torque difference ΔT increases. In other words, in the correction information, the correction amount of the decrease correction when the torque difference ΔT is the positive first value is greater than that when the torque difference ΔT is the positive second value. The first value is greater than the second value. Further, in the second region R2 of the correction information, the difference value Q increases as the torque difference ΔT increases. That is, in the second region R2, the correction amount of the amount increase correction increases as the absolute values of the torque differences ΔT increase. In other words, the correction amount of the increase correction when the torque difference ΔT is the negative third value is greater than that when the torque difference ΔT is the negative fourth value. The absolute value of the third value is greater than the absolute value of the fourth value. Further, as described above, in the correction information, when the difference value Q of the first region R1 and the difference value Q of the second region R2 are compared for the case in which the absolute values of the torque differences ΔT are the same, the difference value Q of the second region R2 is greater than the difference value Q of the first region R1 in the respective absolute values of the torque differences ΔT. That is, with respect to the absolute value of each torque difference ΔT, the correction amount of the increase correction is greater than the correction amount of the decrease correction.

OPERATION AND ADVANTAGES OF EMBODIMENT (1) The overall flow of injection control will be described. In the injection control, when the torque difference ΔT for each of the cylinders 22 is calculated in step S10, the CPU 91 calculates the correction coefficient N for each of the cylinders 22 by the process of step S30 or step S100. The CPU calculates the corrected injection amount FH for each of the cylinders 22 based on the calculated correction coefficient N (step S50). The CPU causes each injector 25 to inject the corrected injection amount FH for each of the cylinders 22 (step S60). When calculating the correction coefficient N for each of the cylinders 22, the CPU 91 basically calculates the correction coefficient N by the processing of step S100. In step S100, for the cylinders 22 for which the torque difference ΔT is a positive value, the CPU 91 corrects the base injection amount FB using the correction coefficient N of the first region R1 in the correction information. The cylinder 22 in which the torque difference ΔT has a positive value is a high-torque cylinder having a large individual cylinder torque with respect to the all-cylinder mean torque. That is, the CPU 91 decreases the base injection amount FB of the high torque cylinders. On the other hand, in step S100, for the cylinders 22 for which the torque difference ΔT is a negative value, the CPU 91 corrects the base injection amount FB using the correction coefficient N of the second region R2 in the correction information. Here, the cylinder 22 in which the torque difference ΔT has a negative value is a low-torque cylinder having an individual cylinder torque less than the all-cylinder mean torque. That is, the CPU 91 increases the base injection amount FB of the low torque cylinders.

If the air-fuel ratio in the cylinder 22 is on the lean side, the combustion state of the air-fuel mixture in the cylinder 22 may become unstable. Further, the torque of the cylinder 22 is likely to fluctuate in response to misfire or the like. In contrast, as described above, in the correction information of the present embodiment, when the correction amount of the increase correction and the correction amount of the decrease correction are compared for the case in which the absolute values of the torque differences ΔT are the same, the correction amount of the increase correction is set to be greater than the correction amount of the decrease correction. By correcting the base injection amount FB using such correction information, the correction amount with respect to the base injection amount FB is increased in the low torque cylinder in which the torque difference ΔT is negative. Therefore, in the low torque cylinder, it is possible to bring the individual cylinder torque of the cylinder close to the all-cylinder mean torque while quickly eliminating the instability of the combustion state of the air-fuel mixture. As a result, in the low torque cylinder, the situation in which the torque in the cylinder is likely to fluctuate due to the lean air-fuel ratio is eliminated. In addition, the torque difference ΔT from the other cylinders 22 can be eliminated. Therefore, as a whole, fluctuations in the torque of the internal combustion engine 20 can be suppressed. On the other hand, in the high-torque cylinder in which the torque difference ΔT is positive, the correction amount with respect to the base injection amount FB is reduced by correcting the base injection amount FB using the correction information. Therefore, in the high-torque cylinder, the individual cylinder torque of the cylinder can be brought close to the all-cylinder mean torque without abruptly changing the air-fuel ratio. That is, in the high-torque cylinder, the torque difference ΔT from the other cylinders 22 can be eliminated without abruptly changing the torque. Therefore, as a whole, fluctuations in the torque of the internal combustion engine 20 can be suppressed. In general, the configuration of the present embodiment can suppress fluctuations in the torque of the internal combustion engine 20.

(2) As the air-fuel ratio in the cylinder 22 is leaner, the combustion state of the air-fuel mixture in the cylinder 22 becomes more unstable. Therefore, as the air-fuel ratio in the cylinder 22 is leaner, it is necessary to eliminate the instability of the combustion state more quickly. In contrast, in the second region R2 of the correction information of the present embodiment, the correction amount of the increase correction is set to be larger as the absolute values of the torque differences ΔT are larger. Therefore, when the absolute value of the torque difference ΔT is large, the torque difference ΔT can be quickly eliminated. That is, the instability of the combustion state can be quickly eliminated.

On the other hand, in the case of the above-described high-torque cylinder in which the air-fuel ratio in the cylinder 22 is on the rich side, it is desirable to avoid a rapid change in the air-fuel ratio in the cylinder. However, if the air-fuel ratio is gradually changed when the deviation of the individual cylinder torque from the all-cylinder mean torque is considerably large, the state in which the torque difference ΔT exists continues for a long time. In contrast, in the first region R1 of the correction information of the present embodiment, the correction amount of the decrease correction is set to be larger as the torque difference ΔT is larger. Therefore, when the torque difference ΔT is large, the torque difference ΔT can be quickly eliminated.

(3) For example, from the viewpoint of improving exhaust emissions, fuel injection may be performed in multiple stages during one combustion cycle. When fuel injection is performed in multiple stages, the amount of fuel injected per injection is reduced. When the amount of fuel injected at a time is small, an error in the amount of fuel injected from the injector 25 tends to increase due to the structure of the injector 25. Therefore, in the case in which the fuel injection is performed in multiple stages, if the fuel injection is performed without taking any special measures, there is a possibility that the variation in the air-fuel ratio and the torque among the cylinders 22 becomes large. In other words, when the fuel injection is performed in multiple stages, it is particularly required to suppress the torque difference ΔT between the cylinders 22. In response to such a request, the present embodiment controls the amount of fuel supplied to each cylinder 22 by using correction information. Therefore, the present embodiment is particularly effective in suppressing fluctuations in the torque of the internal combustion engine 20 that performs fuel injection in multiple stages.

Figure 4:
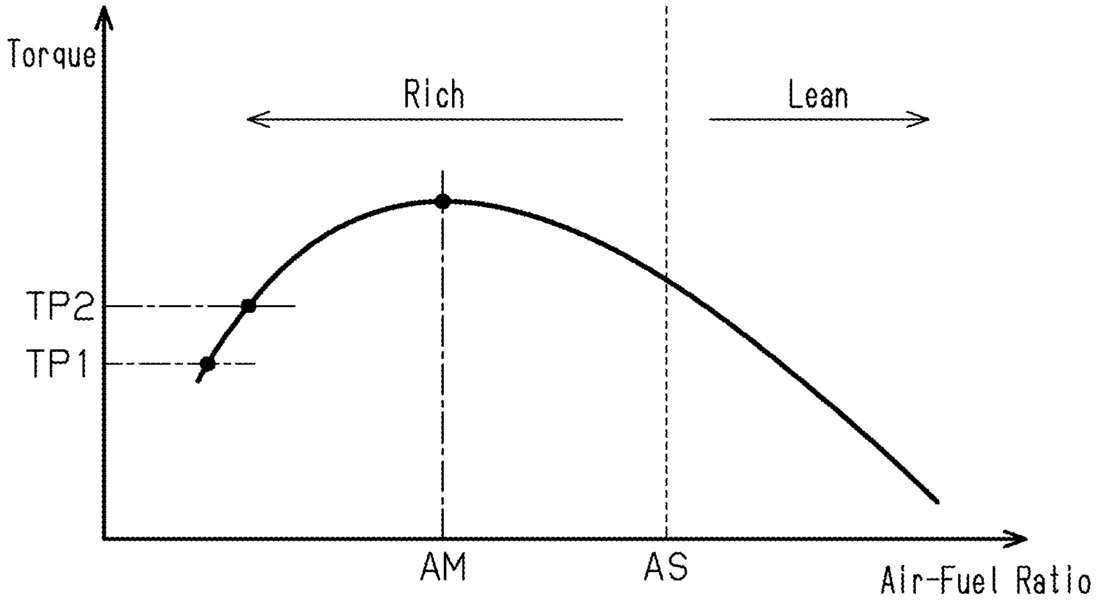
FIG. 4 is a graph showing the relationship between the air-fuel ratio and the torque in the internal combustion engine shown in FIG. 1.

(4) The reason why the processes of step S20 and step S30 are provided will be described. As a premise, as shown in FIG. 4, when the air-fuel ratio in the cylinder 22 is richer than the stoichiometric air-fuel ratio AS, the torque of the cylinder 22 becomes maximum at the maximum air-fuel ratio AM. When the air-fuel ratio in the cylinder 22 is richer than the maximum air-fuel ratio AM, the torque of the cylinder 22 decreases as the degree of richness of the air-fuel ratio increases. In this connection, when there is a cylinder 22 in which the air-fuel ratio is excessively rich during the operation of the internal combustion engine 20, the individual cylinder torque of the cylinder 22 may fall below the all-cylinder mean torque. Accordingly, the torque difference ΔT of the cylinder 22 can be a negative value. When the torque difference ΔT is a negative value, the correction coefficient N corresponding to the torque difference ΔT in the correction information is a positive value. This means that the base injection amount FB is increased. That is, in a case in which the correction coefficient N is calculated using the correction information, when there is a cylinder 22 in which the air-fuel ratio is excessively rich, the fuel injection amount of the cylinder 22 can be increased. However, originally, the fuel injection amount of the cylinder 22 in which the air-fuel ratio is excessively rich should be decreased.

In order to cope with such a situation, the injection control of the present embodiment adopts the following configuration. That is, in step S10, the CPU 91 stores the individual cylinder torques of the respective cylinders 22 in time series. That is, the CPU 91 monitors the transition of the individual cylinder torque of each of the cylinders 22. Here, the increased-injection cylinder is the cylinder 22 in which the fuel injection amount is increased in the previous injection control. In step S20, the CPU 91 determines whether to increase or decrease the individual cylinder torques of the increased-injection cylinders. That is, the CPU 91 determines whether or not the latest individual cylinder torque in the time series of the individual cylinder torques of the increased-injection cylinders is less than the previous individual cylinder torque. The latest individual cylinder torque is the individual cylinder torque obtained as a result of the previous injection control. The individual cylinder torque one before in the time series is the individual cylinder torque obtained as a result of performing the second previous injection control. As illustrated in FIG. 4, when the latest individual cylinder torque TP1 is less than the previous individual cylinder torque TP2 in the time series in the determination, the torque is decreased in the target increased-injection cylinders even though the increase correction of the fuel injection amount is performed. That is, when the determination result of step S20 is positive (step S20: YES), it can be estimated that the air-fuel ratio of the target increased-injection cylinders is excessively rich. Therefore, when the determination result of step S20 is positive, the CPU 91 treats the target increased-injection cylinders as the specific increased-injection cylinders and advances the process to step S30. In step S30, the CPU 91 sets the injection correction values of the fuel injection amounts for the specific increased-injection cylinders using a specific method. The specific increased-injection cylinder is the cylinder 22 in which the fuel injection amount is increased in view of the torque difference ΔT being negative in the previous injection control. Reflecting this point, as illustrated in FIG. 3, the torque difference ΔTA of the specific increased-injection cylinder at the present time is negative. In the identification method, the CPU 91 treats a positive value having the same magnitude as the magnitude of the negative torque difference ΔTA as the symmetrical torque difference ΔTX. Further, the CPU 91 treats the correction coefficient N corresponding to the symmetrical torque difference ΔTX in the correction information as the specific correction amount NX. The specific correction values NX are values of the first region R1 in the correction information. That is, the specific correction value NX indicates a decrease correction. In the specific method, the CPU 91 forcibly designates the specific correction values NX as the correction coefficients N to be applied to the specific increased-injection cylinders. That is, in the specific method, the CPU 91 sets the specific correction values NX to the correction coefficients N of the specific increased-injection cylinders regardless of the torque differences ΔT of the specific increased-injection cylinders. In step S50 and step S60, the CPU 91 causes the injector 25 to inject the corrected injection amount FH obtained by decreasing the base injection amount FB by the specific correction amount NX. As a result of the decrease correction of the fuel injection amount, the excessively rich state of the air-fuel ratio can be eliminated in the specific increased-injection cylinder. The air-fuel ratio of the specific increased-injection cylinder can return to a value between the maximum air-fuel ratio AM and the stoichiometric air-fuel ratio AS in FIG. 4. That is, the air-fuel ratio of the specific increased-injection cylinder can return to a slightly rich value. Accordingly, the torque difference ΔT of the specific amount-increased-injection cylinder can return to a positive value. If the relationship that the torque difference ΔT is a positive value when the air-fuel ratio in the cylinder 22 is rich is satisfied, an appropriate correction coefficient N can be set. That is, the appropriate correction coefficient N is set so as to correspond to the torque difference ΔT by using the correspondence relationship between the torque difference ΔT and the correction coefficient N in the correction information. Therefore, when the CPU 91 repeats the injection control thereafter, the correction coefficient N of the specific increased-injection cylinders gradually returns to a value suitable for eliminating the torque difference ΔT. That is, when the correction coefficient N is sequentially set from the correspondence with the torque difference ΔT by the normal method, the correction coefficient N of the specific increased-injection cylinder gradually returns to a value suitable for eliminating the torque difference ΔT. Along with this, the torque difference ΔT between the specific amount-increased-injection cylinder and the other cylinders 22 decreases.

(5) As described in the above (4), the specific correction value NX of the present embodiment is set to a value indicating a decrease correction corresponding to the symmetrical torque difference ΔTX. At the specific correction value NX, the correction amount of the decrease correction is expected to be large to some extent. If the correction amount of the decrease correction is large to some extent, there is a high possibility that the state where the air-fuel ratio is excessively rich can be quickly eliminated. There is also a high possibility that the time required for the correction coefficient N to return to an appropriate value thereafter can be shortened.

MODIFICATIONS

The above-described embodiment may be modified as follows. The above-described embodiment and the following modifications can be implemented in combination with each other as long as there is no technical contradiction.

The specific correction value NX is not limited to the example of the above embodiment. The specific correction value NX may be a value indicating the decrease correction.

The processes of step S20 and step S30 are not essential. That is, after step S10, the process of step S100 may always be performed. After step S100, the process may proceed to step S40. If the processes of step S20 and step S30 are eliminated, the process of storing the time series of the individual cylinder torques of the respective cylinders 22 in step S10 or the process of storing the increased-injection cylinders in step S50 may be eliminated.

The correction information is not limited to the example of the above embodiment. The correction information indicates a correspondence relationship between the difference between the individual cylinder torque and the all-cylinder mean torque and the injection correction value of the fuel injection amount by the injector 25, and may satisfy the first matter, the second matter, and the third matter. The first point is that the injection correction amount of the first region R1 is a value indicating the decrease correction. The second point is that the injection correction amount of the second region R2 is a value indicating the increase correction. The third point is that, when the correction amount of the decrease correction and the correction amount of the increase correction are compared for the case in which the absolute values of the torque differences ΔT are the same, the correction amount of the increase correction is greater than the correction amount of the decrease correction at each absolute value of the torque difference ΔT. In the first region R1, when the following fourth condition is satisfied, it is suitable for correcting the fuel injection amount to eliminate the positive torque difference ΔT. As a fourth matter, the correction amount of the decrease correction when the torque difference ΔT is a positive first value is greater than that when the torque difference ΔT is a positive second value. The first value is greater than the second value. Similarly, in the second region R2, if the following fifth matter is satisfied, it is suitable for correcting the fuel injection amount so as to eliminate the negative torque difference ΔT. As a fifth matter, the correction amount of the increase correction when the torque difference ΔT is the negative third value is greater than that when the torque difference ΔT is the negative fourth value. The absolute value of the third value is greater than the absolute value of the fourth value. However, it is not essential to satisfy the fourth condition. It is not essential to satisfy the fifth condition.

A value obtained by subtracting the individual cylinder torque from the all-cylinder mean torque may be handled as the torque difference ΔT. Accordingly, the contents of the correction information may be changed as appropriate.

The injection correction value of the fuel injection amount is not limited to a value for correcting the base injection amount FB by multiplication. For example, the injection correction value may correct the base injection amount FB by addition.

A value different from the stoichiometric air-fuel ratio AS may be set as the target air-fuel ratio.

It is not essential to adopt a mode in which fuel injection is performed in multiple stages for one cylinder 22 in one combustion cycle. That is, the fuel injection may be always performed only once for one cylinder 22 in one combustion cycle.

The overall configuration of the internal combustion engine 20 is not limited to the example of the above embodiment. For example, if fuel injection in multiple stages is not employed, the injector 25 may be of a type that supplies fuel to the cylinder 22 via the intake passage 23. The number of the cylinders 22 is not limited to four.

The specified cycle is not limited to one combustion cycle. The specified cycle may be, for example, multiple combustion cycles. The base injection amount FB and the like may be appropriately changed in accordance with handling of a specified cycle.

The controller is not limited to a device that includes a the CPU and a ROM and executes software processing. That is, the controller may be modified as long as it has any one of the following configurations (a) to (c).

(a) The controller includes one or more processors that execute various processes in accordance with a computer program. The processor includes a the CPU and a memory module, such as a RAM and ROM. The memory module stores program codes or instructions configured to cause the CPU to execute the processes. The memory module, or a computer-readable medium, includes any type of media that are accessible by general-purpose computers and dedicated computers.

(b) The controller includes one or more dedicated hardware circuits that execute various processes. Examples of the dedicated hardware circuits include an application specific integrated circuit (ASIC) and a field programmable gate array (FPGA).

(c) The controller includes a processor that executes part of various processes according to programs and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for injectors, the controller comprising processing circuitry and a memory module, wherein the memory module stores correction information, the correction information indicates a correspondence relationship between a torque difference and an injection correction value, control targets of the controller are the injectors, an internal combustion engine includes multiple cylinders, the injectors are provided for the respective cylinders so as to supply fuel to each of the cylinders, the processing circuitry is configured to repeatedly execute injection control during operation of the internal combustion engine, and the injection control includes:

calculating a torque difference for each of the cylinders over a specified period of time during operation of the internal combustion engine, wherein the torque difference is a difference between an individual cylinder torque and an all-cylinder mean torque, the individual cylinder torque is a mean value of the torque of each of the cylinders over the specific period of time, and the all-cylinder mean torque is a mean value of the torque for all of the cylinders over the specific period of time;

calculating, based on the correction information, the injection correction value in correspondence with the torque difference for each cylinder, wherein the injection correction value is a correction value for a fuel injection amount from each injector, in the correction information, the injection correction value for a case in which the individual cylinder torque is greater than the all-cylinder mean torque is a value indicating a decrease correction, the injection correction value for a case in which the individual cylinder torque is less than the all-cylinder mean torque is a value indicating an increase correction, the decrease correction decreases the fuel injection amount, the increase correction increases the fuel injection amount, and when an absolute value of the torque difference during the increase correction is equal to an absolute value of the torque difference during the decrease correction, a correction amount of the increase correction is greater than a correction amount of the decrease correction;

calculating a corrected injection amount for each of the cylinders by using the injection correction value, wherein the corrected injection amount is obtained by correcting a base injection amount with the injection correction value, and the base injection amount corresponds to an operating state of the internal combustion engine; and supplying the corrected injection amount to each of the cylinders at a specified cycle through control of the injectors during the specific period of time, wherein the injection control includes a current injection control, a previous injection control, and a second previous injection control, the current injection control is a newly performed injection control, the previous injection control is performed prior to the current injection control, the second previous injection control is performed prior to the previous injection control, and in the current injection control, the processing circuitry is configured to when calculating the torque difference, store the individual cylinder torque obtained through the supply of the corrected injection amount by the previous injection control in the memory module, when calculating the corrected injection amount, store an increased-injection cylinder in the memory module, the corrected injection amount of the increased-injection cylinder being greater than the base injection amount, when calculating the torque difference, determine whether the individual cylinder torque obtained through the supply of the corrected injection amount in the previous injection control is less than the individual cylinder torque obtained through the supply of the corrected injection amount in the second previous injection control, for the cylinder stored as the increased-injection cylinder in the previous injection control, if the determination is affirmative when calculating the injection correction value, set the injection correction value of the increased-injection cylinder to a specific correction value, the specific correction value being a value indicating the decrease correction, the specific correction value being determined in advance regardless of the torque differences of the increased-injection cylinder, and if the determination is negative, set the injection correction value of the increased-injection cylinder to a value that corresponds to the torque differences of the increased-injection cylinder based on the correction information.

2. The controller for the injectors according to claim 1, wherein the torque difference is a value obtained by subtracting the all-cylinder mean torque from the individual cylinder torque, in the correction information, a correction amount of the decrease correction in a case in which the torque difference is a positive first value is greater than that in a case in which the torque difference is a positive second value, the first value being greater than the second value, and a correction amount of the increase correction in a case in which the torque difference is a negative third value is greater than that in a case in which the torque difference is a negative fourth value, an absolute value of the third value being greater than an absolute value of the fourth value.

3. The controller for the injectors according to claim 1, wherein the specified cycle is a continuous period of time in which one of the cylinders undergoes one intake stroke, one compression stroke, one expansion stroke, and one exhaust stroke, and the processing circuitry is configured to, when supplying the corrected injection amount, divide the corrected injection amount into multiple divided amounts and supply the multiple divided amounts to the cylinder in multiple stages during the single specified cycle through control of the injector.

4. The controller for the injectors according to claim 1, wherein the torque difference is a value obtained by subtracting the all-cylinder mean torque from the individual cylinder torque, a symmetrical torque difference is a positive value, the symmetrical torque difference being equal to the absolute value of the torque difference of the increased-injection cylinder, and the specific correction value is set to a value that corresponds to the symmetrical torque difference in the correction information and indicates the decrease correction.

* * * * *